United States Patent [19]

Hojo et al.

[11] Patent Number: 5,247,748
[45] Date of Patent: Sep. 28, 1993

[54] GYRO COMPASS

[75] Inventors: Takeshi Hojo; Shin-Ichi Kawada; Noboru Itakura, all of Tokyo, Japan

[73] Assignee: Tokimec Inc., Tokyo, Japan

[21] Appl. No.: 837,865

[22] Filed: Feb. 18, 1992

[30] Foreign Application Priority Data

Feb. 21, 1991 [JP] Japan ................... 3-27438

[51] Int. Cl.$^5$ .............................................. G01C 19/34
[52] U.S. Cl. .......................................... 33/326; 33/324
[58] Field of Search ......................... 33/324, 325, 326; 364/443, 571.02, 559

[56] References Cited

FOREIGN PATENT DOCUMENTS 2211608 7/1989 United Kingdom ................... 33/324

Primary Examiner—William A. Cuchlinski, Jr.
Assistant Examiner—Alvin Wirthlin
Attorney, Agent, or Firm—Bauer & Schaffer

[57] ABSTRACT

A gyro compass having a gyro case housing therein a gyro whose spin axis is held substantially in the horizontal plane, a supporting device for supporting the gyro case with freedom of three axes and means for applying a torque proportional to an inclined angle of the gyro spin axis relative to the horizontal plane around a vertical axis of the gyro case perpendicular to the spin axis is disclosed in which there are provided a detecting device for detecting an inclination angle of the spin axis relative to said horizontal plane, torquer for applying a torque to the gyro case about its vertical axis, and an acceleration error controlling device for receiving an output signal from the detecting means and for controlling the torquer such that the torquer produces a predetermined torque to be applied to the gyro case about its vertical axis.

4 Claims, 7 Drawing Sheets

GYRO COMPASS

BACKGROUND OF THE INVENTION

The present invention generally relates to gyro compasses and, more particularly, is directed to a high accuracy gyro compass for use with a ship.

2. Description of the Prior Art

Referring to the drawings in detail, and initially to FIG. 1, let us describe a gyro compass described in Japanese Patent No. 428317 as an example of a conventional gyro compass to which the present invention can be applied.

The entirety of the gyro compass is depicted by reference symbol A in FIG. 1, and the gyro compass A includes a gyro case 1. As shown in FIG. 1, the gyro case 1 houses therein a gyro rotor (not shown) which is rotated at high speed and at a constant revolution rate by an induction motor (not shown), and a rotary vector of the gyro rotor is directed to the south (i.e., directed in the clockwise direction as viewing from the north N). The gyro case 1 has a pair of vertical shafts 2, 2' protruded from the upper and lower portions thereof, and these protruded vertical shafts 2, 2' are respectively fitted into inner rings of ball bearings 4, 4' mounted to corresponding positions of a vertical ring 3 provided outside of the gyro case 1. A suspension wire 5 is secured at its lower end to the upper vertical shaft 2 and the upper end thereof is attached to the vertical ring 3 by means of a suspension wire mount 5'.

According to the above-mentioned arrangement, the weight of the gyro case 1 is not applied to the ball bearings 4, 4' of the vertical shafts 2, 2' as a thrust load but is fully received by the suspension wire 5, thereby the friction torque of the above-mentioned ball bearings 4, 4' being reduced considerably. A pair of liquid ballistics 6 are mounted on the east and west of the vertical ring 3 in order to apply a north-seeking torque to the gyro.

As shown in FIG. 2, each of the liquid ballistics 6 is a kind of a communicated tube and is composed of reservoirs 6-1', 6-1 disposed in the north and south of the gyro, liquid 6-2 of high specific gravity substantially filled into these reservoirs 6-1, 6-1' substantially up to the halves thereof, an air tube 6-3 communicating the north and south reservoirs 6-1', 6-1 above and a liquid tube 6-4 communicating the north and south reservoirs 6-1', 6-1 below.

Referring to FIG. 1, it will be seen that a damping weight 7 is mounted on the west side of the gyro case 1 in order to damp the north-seeking movement. As shown in FIG. 1, a primary coil 8-1 of a differential transformer for detecting a deviation angle between the gyro case 1 and the vertical ring 3 is attached to the east side of the gyro case 1, and a secondary coil 8-2 of the differential transformer is attached to the opposed position of the vertical ring 3, thereby constituting a follow-up pickup 8. The vertical ring 3 includes a pair of horizontal shafts 9, 9' protruded outwardly from the east and west positions thereof perpendicular to both of the vertical shafts 2, 2' and the gyro spin axis. These horizontal shafts 9, 9' are respectively fitted into inner rings of ball bearings 11, 11' attached to the corresponding positions of a horizontal ring 10 provided outside of the vertical ring 3. The horizontal ring 10 has a pair of gimbal shafts 12, 12' disposed at its positions within the horizontal plane and which are perpendicular to the horizontal shafts 9, 9'. These gimbal shafts 12, 12' are respectively fitted into a pair of gimbal shaft ball bearings 14, 14' attached to a follow-up ring 13 disposed outside of the horizontal ring 10.

As shown in FIG. 1, the follow-up ring 13 has upper and lower follow-up shafts 15, 15' and these follow-up shafts 15, 15' are respectively fitted into follow-up shaft ball bearings 17, 17' disposed at the opposing positions of a binnacle 16.

The upper follow-up shaft 15 has a compass card 18 attached at its shaft end and an azimuthal angle in the bow of a ship is read by the cooperation of the compass card 18 and a lubber line 18B secured to the binnacle 16 at the corresponding position in the bow side. An azimuth servo motor 19 is attached to the lower portion of the binnacle 16, the rotary shaft 19A of which is coupled through an azimuth pinion 20 to an azimuth gear 21 located at the lower portion of the follow-up ring 13. An azimuth transmitter 22 is attached to the lower portion of the binnacle 16 and its rotary shaft 22A is meshed with the azimuth gear 21 via a gear train (not shown), whereby an azimuth signal is converted into an electrical signal by the azimuth transmitter 22, which is transmitted to the outside.

The part within the horizontal ring 10, that is, the part including the horizontal ring 10, the vertical ring 3, the gyro case 1 or the like is normally called a gyro sensitive element. The gyro sensitive element constructs a vertical physical pendulum around the gimbal shafts 12, 12', whereby the horizontal shafts 9, 9' are constantly kept within the horizontal plane regardless of ship's inclination.

If there is a difference between the azimuth of the gyro case 1 and the azimuth of the vertical ring 3, then such difference is detected and converted into an electrical signal by the follow-up pickup 8 provided between the gyro case 1 and the vertical ring 3. The resultant electrical signal is amplified by an external servo amplifier 23 and supplied to the azimuth servo motor 19 (which forms an azimuth servo system). The rotation of the azimuth servo motor 19 is transmitted through the rotary shaft 19A, the gear train (not shown) and the azimuth gear 21 to the follow-up ring 13 and is further transmitted through the horizontal ring 10, the horizontal shafts 9, 9' or the like to the vertical ring 3, thereby constantly holding the azimuthal error between the vertical ring 3 and the gyro case 1 at zero.

Owing to the action of the azimuth servo system, the horizontal shafts 9, 9' and the gyro spin axis are constantly kept in an orthogonal relation and the gyro can be prevented from being applied with the twisting torque of the suspension wire 5. That is, owing to the actions of the three shafts such as the vertical shafts 2, 2', the horizontal shafts 9, 9' and the gimbal shafts 12, 12' having the servo system, the gyro case 1 is completely isolated from the angular motion of the ship, thereby the gyroscope being constructed.

The above-mentioned liquid ballistics 6 are adapted to give the gyroscope the north-seeking force, i.e., function as the compass.

The principle of the liquid ballistic 6 will be described with reference to FIG. 2. FIG. 2 shows the case such that the north-seeking end of the gyro is inclined upward from the horizontal plane by an angle $\theta$. In this case, assuming that the ship is in its stopped condition, then the liquid surface of the liquid 6-2 becomes perpendicular to the direction of gravity force g. Therefore, as compared with the case such that the inclination of the north-seeking end relative to the horizontal plane is zero, the liquid in the hatched portion of FIG. 2 is decreased in the north-side reservoir 6-1' and is increased in the south-side reservoir 6-1. Assuming now that $r_1$ is a distance from the horizontal shafts 9, 9' to the center of the two reservoirs 6-1, 6-1', S is a cross section area of the two reservoirs 6-1, 6-1' and $\rho$ is a specific gravity of the liquid 6-2, then the weight W of the liquid in the inclined portion is expressed as:

$$W = S \times r_1 \sin \theta \times \rho \times g \qquad (1)$$

Since the above-mentioned weight unbalance occurs in the two south and north reservoirs 6-1, 6-1' and the moment arm from the horizontal shafts 9, 9' is $r_1$, a torque $T_H$ produced about the horizontal shafts 9, 9' by the liquid ballistics 6 when the north-seeking end of the gyro is inclined from the horizontal plane by $\theta$ is approximately calculated as:

$$T_H = 2 S r_1^2 g \rho \theta \qquad (2)$$

When the following equation (3) is established, $$2 S r_1^2 g \rho = K \qquad (3)$$

K is referred to as the ballistic constant. That is, the liquid ballistics 6 act to apply the torque proportional to the inclination of the gyro spin axis relative to the horizontal plane to the tyro around the horizontal shafts 9, 9' of the gyro, thereby rendering the north-seeking force to the gyro. Thus, the gyro is rendered the gyro compass.

As described above, we have considered so far the case that the ship is in the still condition. In this case, assuming that $a_N$ is a south-north component of ship's acceleration due to increase and decrease of ship's speed, ship's turning or the like, a torque $T_{H1}$ generated from the liquid ballistic 6 under the ship's sailing condition is expressed by the following equation:

$$T_{H1} = K \cdot \left( \theta - \frac{a_N}{g} \right) \qquad (4)$$

As shown in FIG. 3, the damping weight 7 is attached to the gyro case 1 with a distance $r_2$ (in the direction perpendicular to the sheet of drawing) from the vertical shafts 2, 2' within the plane including the vertical shafts 2, 2' and perpendicular to the gyro spin axis. FIG. 3 shows the gyro case 1 under the condition such that the north-seeking side of the gyro is inclined upward from the horizontal plane by the angle $\theta$ as viewing from the west. As shown in FIG. 3, a gravitational acceleration g acts on the damping weight 7 of mass m so that a force of $m \times g$ acts on the damping weight 7 in the vertical direction. In this case, let us consider that this force is divided into a component $m g \cos \theta$ parallel to the vertical shafts 2, 2' and a component $m g \sin \theta$ parallel to the spin axis. The component $m g \cos \theta$ parallel to the vertical shafts 2, 2' acts only as a load on the vertical shaft ball bearings 4, 4', while the component $m g \sin \theta$ parallel to the spin axis acts on the gyro as a torque multiplied with a distance $r_2$ from the vertical shafts 2, 2' around the vertical shafts 2, 2'. Assuming that $T\phi$ represents the above torque, then the torque $T\phi$ is approximately given by the following equation:

$$T\phi = \mu \cdot \theta \qquad (5)$$

where $\mu = m g r_2$.

That is, the damping weight 7 can be regarded as the apparatus which applies the vertical axes 2, 2' of the gyro with the torque proportional to the inclination of the gyro spin axis relative to the horizontal plane, and the north-seeking motion of the compass can be damped by the damping weight 7.

Further, a torque $T\phi 1$ generated during the ship's sailing is expressed by the following equation, considering the acceleration caused by ship's motion:

$$T\phi 1 = \mu \cdot \left( \theta - \frac{a_N}{g} \right) \qquad (6)$$

FIG. 4 is a schematic functional block diagram which shows the motion of the spin axis of the gyro compass according to the prior art by the Laplace operator and the transfer function in which an azimuth error $\phi$ of the north-seeking end of the gyro spin axis from the true north and the inclination angle $\phi$ are taken as variants. In FIG. 4, g represents the gravitational acceleration, R the earth radius, $\Omega$ the rotation angular velocity of earth, H the angular momentum of gyro, $\lambda$ the latitude at that spot, $\tau G$ the time constant provided when the movement of the liquid surface of the ballistic 6 is approximated by the primary delay, K the north-seeking constant, $\mu$ the damping constant, $a_N$ the acceleration acting on the south-north direction of the gyro case due to the ship's movement, $V_{NS}$ the north-south speed of the ship and S the Laplace operator.

A sum (difference) of the gyro inclined angle $\theta$ and a value $aN/g$, which results from dividing the south-north acceleration $aN$ by the gravitational acceleration g, acts on the primary delay transfer element 50 (time constant $\tau G$) provided by the liquid 6-2 of the ballistic 6 to form the liquid surface inclination $\xi$.

A precessional angular velocity $$\xi \times \frac{K}{H}$$

provided by multiplying $\xi$ with a value K/H (51), which results from dividing the north-seeking constant K by the angular momentum H of the gyro and which is generated around the vertical axis acts around the vertical axis of the gyro case 1 (52) together with the vertical component $\Omega \sin \lambda$ of the earth rotation angular velocity $\Omega$ to produce the azimuthal movement around the vertical axis. Then, the azimuth error $\phi$ is generated. A value, which results from multiplying the azimuth error $\phi$ with the horizontal component $\Omega \cos \lambda$ 53 of the earth rotation angular velocity $\Omega$, is input to a gyro element 54 around the horizontal axis of the gyro as the angular velocity input to thereby generate the gyro inclined angle $\theta$.

The above-mentioned portion is what might be called a north-seeking loop of the gyro compass, in which two poles expressed by 1/S exist within the loop, thereby generating the oscillation solution.

An angular velocity $$\mu \times \left( \theta - \frac{a_N}{g} \right) / H \; 71,$$

which results from dividing by the gyro angular momentum H the torque $$\mu \times \left(\theta - \frac{a_N}{g}\right)$$

around the vertical axis in which $$\theta - \frac{a_N}{g},$$

which results adding the gyro inclined angle $$\theta \text{ with } -\frac{a_N}{g},$$

is multiplied with the damping constant $\mu$ is input to the gyro element 54 around the horizontal axis together with the equivalent angular velocity $V_N/R$ which results from dividing the south-north speed $V_N$ of the ship by the earth radius R, whereby the gyro inclined angle $\theta$ is reduced and the north-seeking movement is damped. Therefore, this loop is called a damping loop.

For the north-seeking loop, the south-north speed $V_N$ generates an azimuth error $\nu$ proportional to the second of the latitude expressed by the following equation.

$$\phi_v = \frac{V_N}{R\Omega \cos \lambda} = \frac{V \cos C}{R \Omega \cos \lambda} \tag{7}$$

where C is the azimuth angle of the ship's heading.

FIG. 5 is a graph illustrating the movement of the gyro when the ship turns by 180° at time $t_1$ from the condition that the ship sails straight ahead on the course 0° for a long period of time and the gyro compass is settled with speed error $\phi v_1$ at that time and then the ship sails straight ahead on the course 180° from time $t_2$. This fundamental influence of the gyro compass exerted by the acceleration can be reduced to the general case of the ship's movement.

An azimuth change $\phi_8$ generated by the acceleration between the time $t_1$ and the time $t_2$ is called as ballistic angle. A design method for making the azimuth change $\phi_8$ equal to the difference between the speed errors before and after the acceleration acts is the important condition called the Schuler tuning in the gyro compass and corrects the influence of the acceleration in the form of acceleration error (the north-seeking period of the gyro compass is extended to 1 to 1.5 hours due to this condition). That is, $$\phi_8 = \phi_{v1} - \phi_{v2} \tag{8}$$

The above-mentioned ballistic amount $\phi_8$ is the function of the speed difference and the difference of the speed error is also the function of the latitude as expressed in the above-mentioned equation. Therefore, strictly speaking, the condition of the above-mentioned equation is established only at a particular latitude (referred to as a reference latitude). In other latitudes, an error $\Delta\phi$ of FIG. 5 is generated immediately after the ship turns and then in accordance with the fundamental movement characteristics of the gyro compass, the gyro compass carries out the damping movement toward the velocity error $\phi v_2$ provided immediately after the ship turns.

The conventional gyro compass produces an error by the acceleration which is caused by the turning of the ship, its speed changing and so on. However, when the integrated value of the above error during the movement such as the turning, speed changing and so on is made just equal to the changing value of the acceleration error, that is, it is corrected by employing the Schuler tuning method, the acceleration error can be suppressed to such a value which causes no problem in practical use. However, recently the speed of a ship becomes higher, and a new high speed ship such as a hydrofoil craft or the like has been developed so that the error correction by using the Schuler tuning proposes a problem of acceleration error in practice.

The period of north-seeking movement of a gyro compass is changing depending on a latitude where the gyro compass exists, while the Schuler tuning is, in strictly speaking, established on the condition that the north-seeking movement period is always 84.5 minutes. Therefore, even if the Schuler tuning is established at a certain latitude for a gyro compass, when the gyro compass moves to another latitude, the Schuler tuning becomes no more established and hence an acceleration error is produced.

When the speed of a ship is about 10 to 15 knots, as in the prior art, if a reference latitude is set at any angle between latitudes of 50° and 55° and the Schuler tuning is established at that angle of latitude, an acceleration error can be suppressed to a tolerable value within a range between 65° and 70° from the equator. However, the above error correction method can never be established for a ship with a speed of 20 to 50 knots. Further, this method is not satisfactory for a ship, which is low in speed but requires high accuracy for its gyro compass, to cause a problem because its accuracy is not satisfactory.

OBJECTS AND SUMMARY OF THE INVENTION

Accordingly, it is an object of the present invention to provide an improved gyro compass free from the afore-mentioned shortcomings and disadvantages encountered in the prior art.

More specifically, it is another object of the present invention to provide a gyro compass which satisfies the correct Schuler tuning at any latitude, correct all of speed errors as speed errors, and can indicate an accurate azimuth always.

According to an aspect of the present invention, there is provided a gyro compass having a gyro case housing therein a gyro whose spin axis is held substantially in the horizontal plane, a supporting device for supporting the gyro case with freedom of three axes and means for applying a torque proportional to an inclined angle of the gyro spin axis relative to the horizontal plane around a vertical axis of the gyro case perpendicular to the spin axis, comprising:

a) detecting means for detecting an inclination angle of the spin axis relative to said horizontal plane;

b) torquer means for applying a torque to the gyro case about its vertical axis; and c) acceleration error controlling means for receiving an output signal from the detecting means and for controlling the torquer means such that the torquer means produces a predetermined torque to be applied to the above vertical axis of the gyro case.

The above and other objects, features, and advantages of the present invention will become apparent from the following detailed description of illustrative embodiments thereof to be read in conjuction with the accompanying drawings, in which like reference numerals are used to identify the same or similar parts in the several views.

DETAILED DESCRIPTION OF THE PREFERRED EMBODIMENTS

An embodiment of the gyro compass according to the present invention will be described with reference to the attached drawings.

Figure 6:
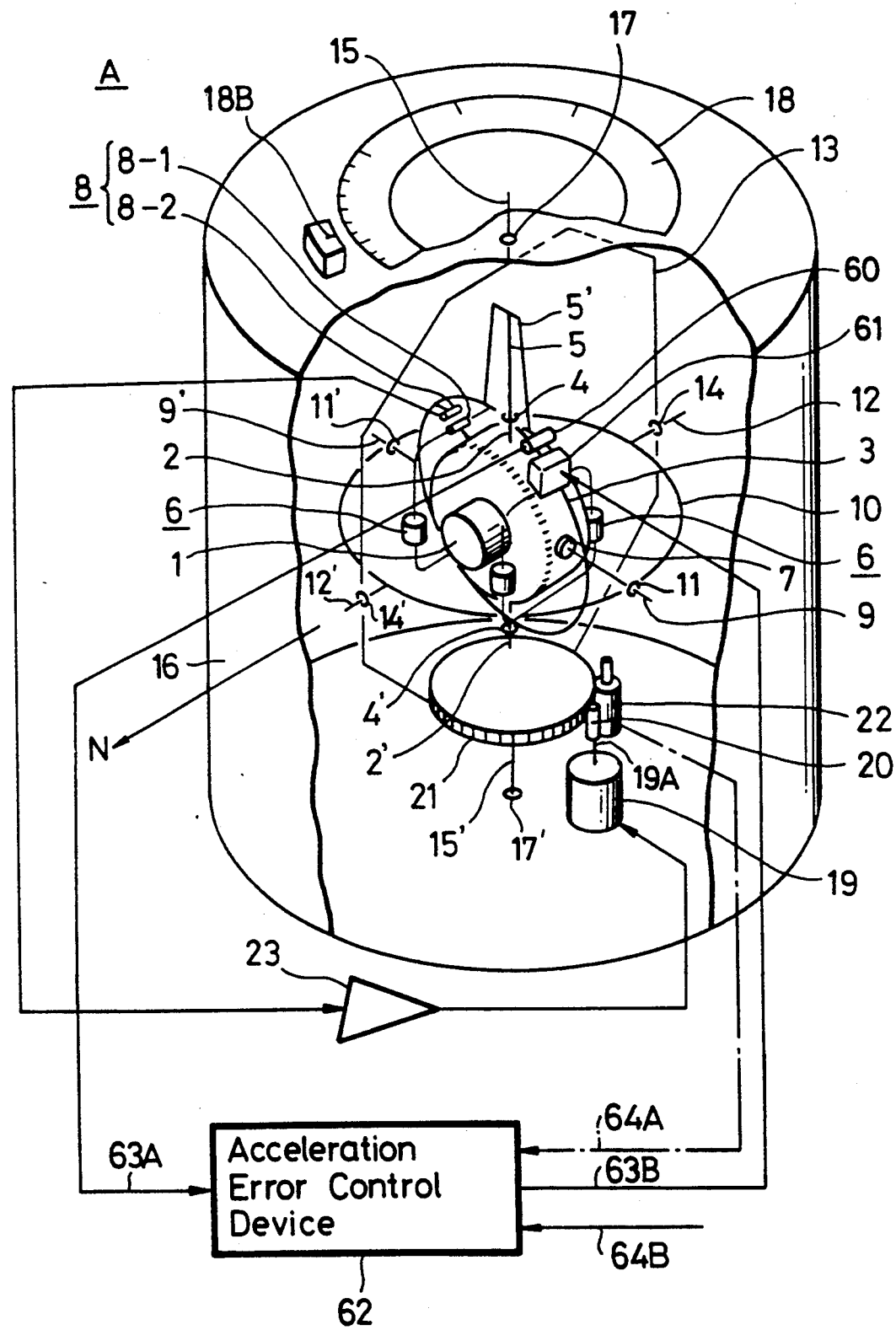
FIG. 6 shows a perspective view of an embodiment of the gyro compass according to the present invention.

FIG. 6 shows an embodiment of the gyro compass according to the present invention. The embodiment shown in FIG. 6 has the elements common or similar to those shown in FIG. 1 so that the same references therein designate the similar or same elements and hence their description will be omitted.

Figure 1:
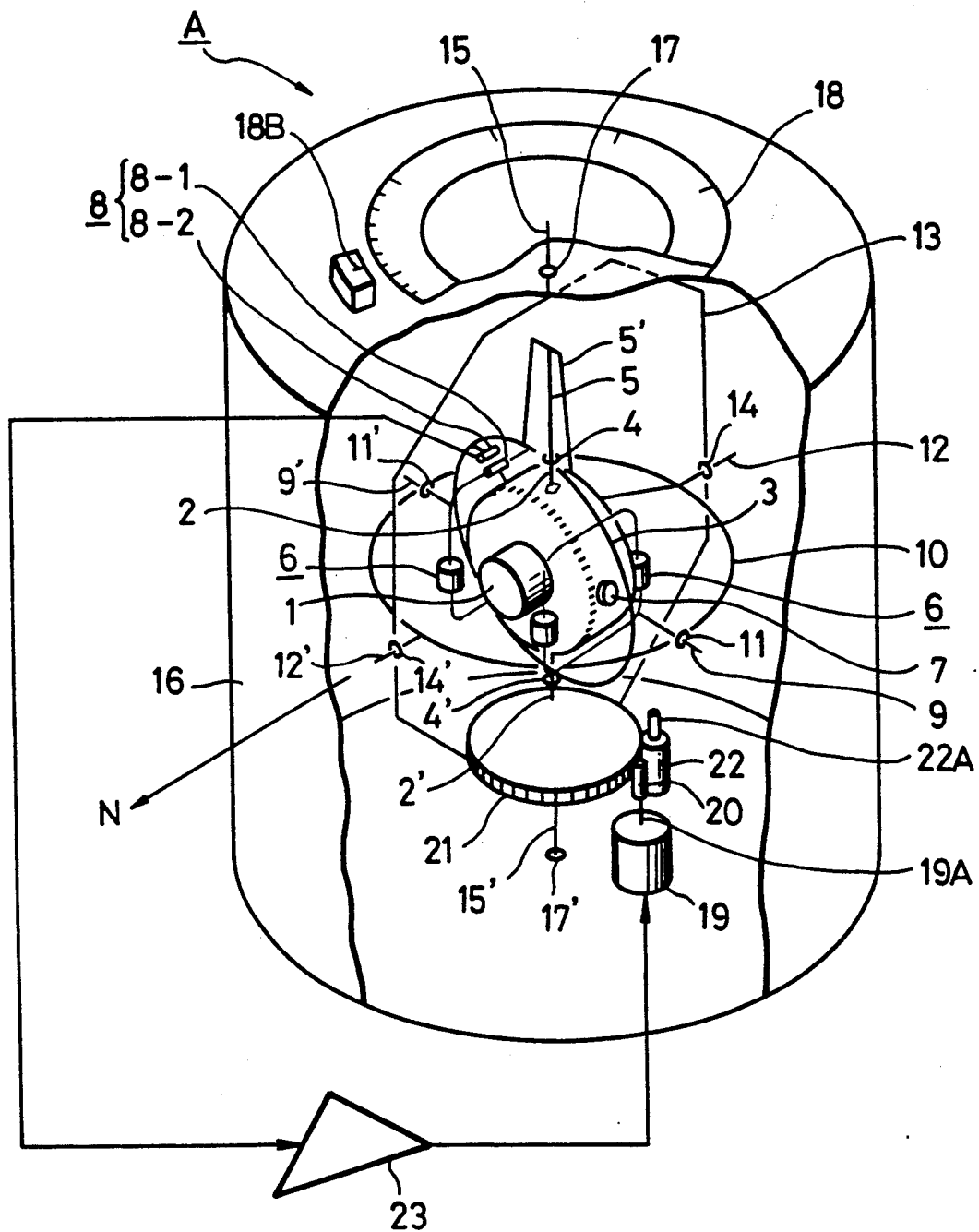
FIG. 1 shows an example of a conventional gyro compass in a perspective view fashion and to which the present invention is applied.
Figure 2:
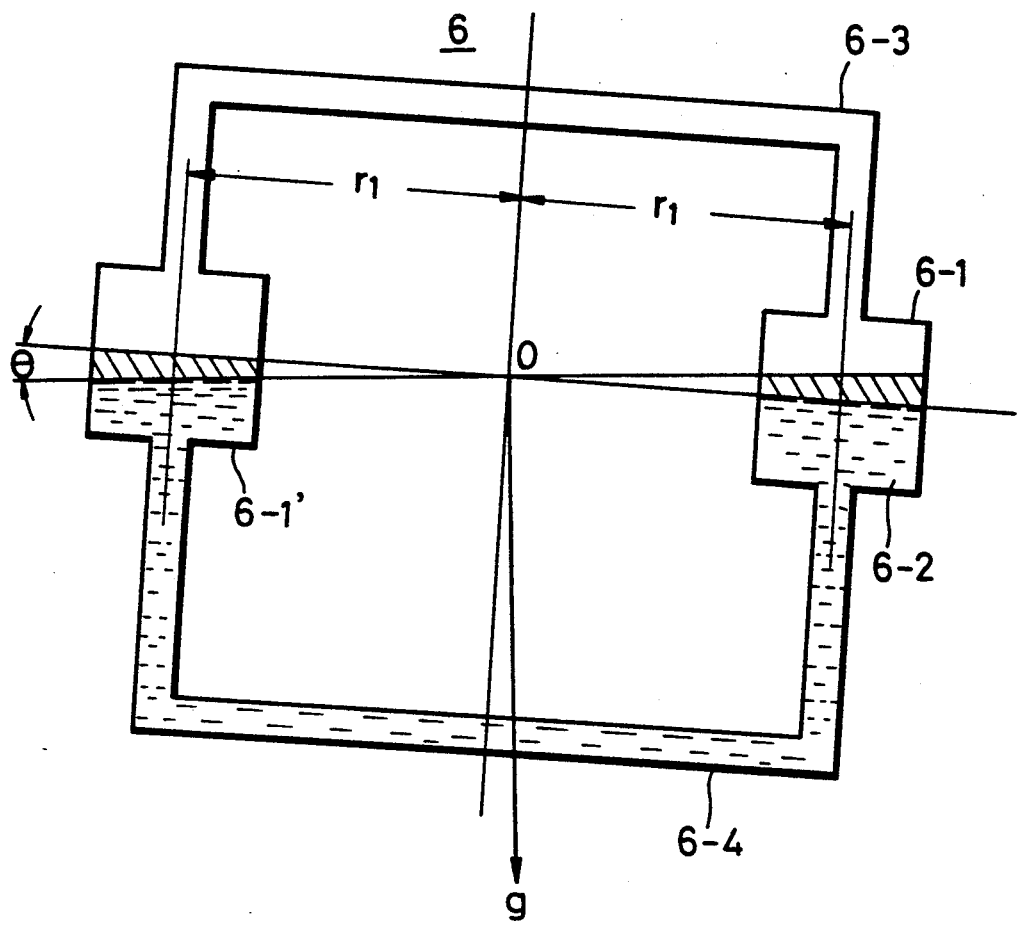
FIG. 2 shows a schematic diagram of a liquid ballistic used in the conventional gyro compass of FIG. 1.
Figure 3:
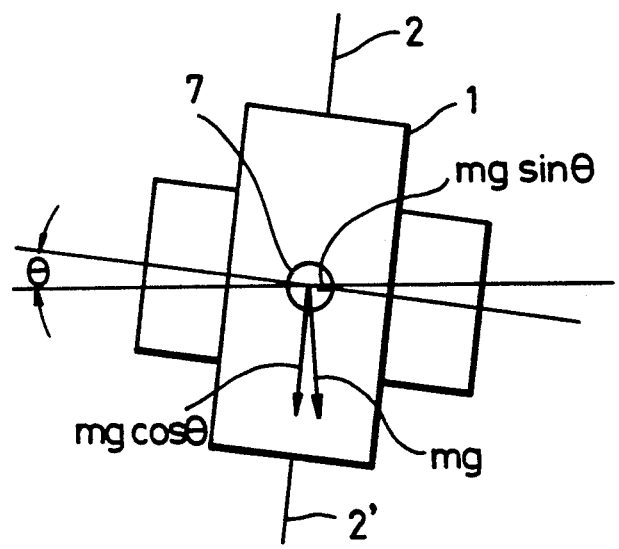
FIG. 3 is a schematic diagram used to explain a principle of the damping weight used in the prior-art gyro compass shown in FIG. 1.

The embodiment of the invention shown in FIG. 6 is different from the prior art example shown in FIG. 1 in the following points:

The first point is that an accelerometer 60 is attached to the vertical ring 3 so as to detect the acceleration in the direction parallel to the gyro spin axis; the second point is the provision of a vertical torquer 61 which is attached to the vertical ring 3 to apply a torque to the gyro case 1 about the vertical shafts 2 and 2'; and the third point is the provision of an acceleration error control device 62 in which an output signal from the accelerometer 60 is supplied through a line 63A to the acceleration error control device 62 and a signal generated thereby is supplied through a line 63B to the vertical torquer 61.

Figure 4:
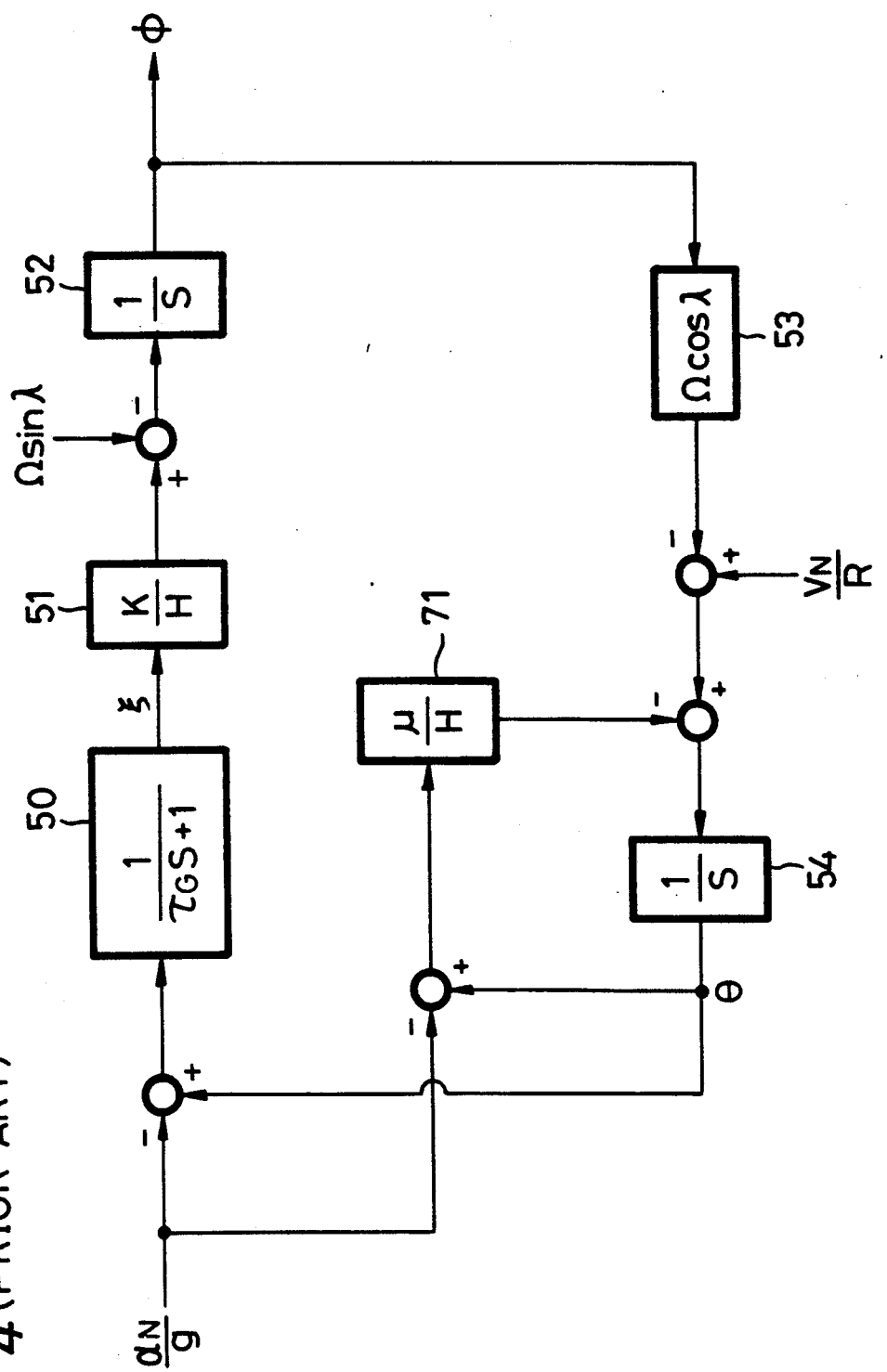
FIG. 4 shows a functional block diagram of the gyro compass shown in FIG. 1.
Figure 7:
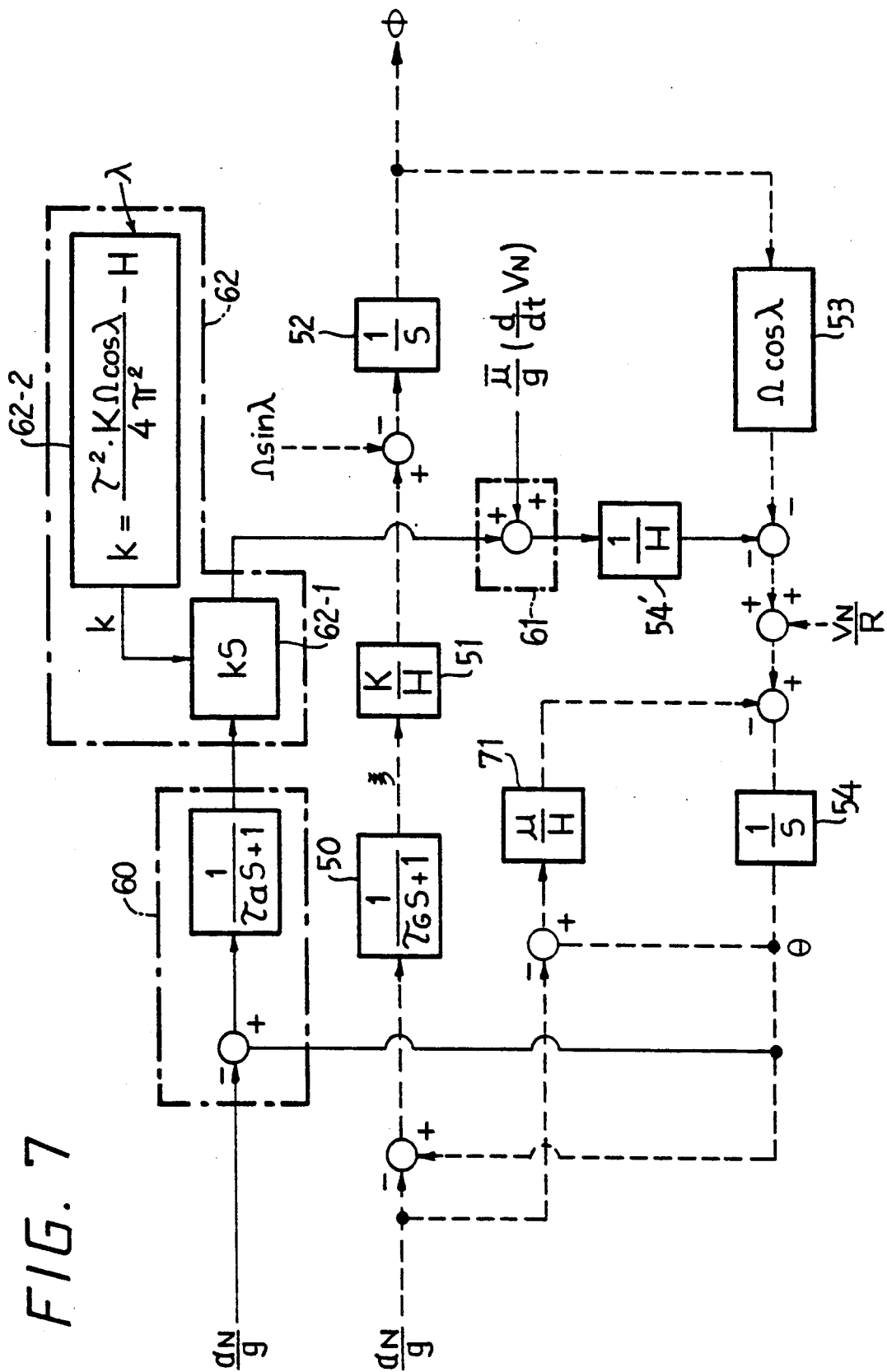
FIG. 7 shows a functional block diagram of the gyro compass according to the present invention.

The functions generated by the above elements will be described in connection with FIG. 7 in which the elements similar to those of FIG. 4 are marked with the same references and the description thereof will be omitted. In FIG. 7, the portions newly added are shown by solid lines and the remaining portions or the same portions to those of FIG. 4 are shown by broken lines.

As shown in FIG. 7, the accelerometer 60 detects the south-north horizontal acceleration $a_N$ together with the gyro inclination angle $\theta$ in the form of $(\theta - a_N/g)$ and delivers a total amount thereof as an output signal. This output signal is differentiated in the acceleration error control device 62 which comprises a differentiator 62-1 and a coefficient calculator 62-2 and in which a value of $\lambda$ is supplied from the outside to the coefficient calculator 62-2 and a coefficient k thus calculated is supplied therefrom to the differentiator 62-1, the differentiated value is multiplied by a coefficient k in the differentiator 62-1 and then supplied to the vertical torquer 61. Since the precession about the horizontal axis of the gyro is a value which is resulted by dividing the torque applied to the gyro by the angular momentum H, if the above loop exists, that is, the coefficient k is not zero, when the gyro is inclined and, for example, $\theta$ is tended to be increased, the rate of $\theta$ is decreased by the torque applied to the gyro through the accelerometer 60 and the acceleration error control device 62. In other words, if both values are mutually additive, when $\theta$ increases, the above movement is accelerated. Thus, the movement of the gyro compass becomes fast and hence the north-seeking movement period becomes short. If on the contray, the sign of k is reverse and both the values are mutually subtractive, the north-seeking movement period becomes long. The gyro period when k is zero and the influence of the damping weight 7 exerted on the period is not taken into consideration, that is, the fundamental gyro period T, which is well known by a professional book in the field of the gyro compass, is expressed as follows:

$$T = 2\pi / \sqrt{\frac{K\Omega\cos\lambda}{H}} \tag{9}$$

where K is the ballistic constant as expressed by the equation (3). If the value K is selected such that the period T expressed by the equation (9) becomes 84.5 minutes accurately at a reference latitude $\lambda_0$, the Schuler tuning is performed correctly at the latitude $\lambda_0$, the equation (8) is established correctly and $\Delta\phi$ shown in FIG. 5 becomes zero. When such the gyro compass moves to a position with a latitude $\lambda$ different from $\lambda_0$, a new correct Shuler tuning can be again established in the gyro compass of the present invention shown in FIGS. 6 and 7 by changing the value of k into a value corresponding to the new latitude $\lambda$ in the acceleration error control device 62. The equation of the fundamental period T at that event is approximately expressed by the following equation according to the study by the inventors of this invention:

$$T \approx 2\pi / \sqrt{\frac{K\Omega\cos\lambda}{H + k}} \tag{10}$$

From the equation (10), following equation (10-1) can be derived $$k \approx \frac{T^2 \cdot K\Omega\cos\lambda}{4\pi^2} - H \tag{10-1}$$

Figure 5:
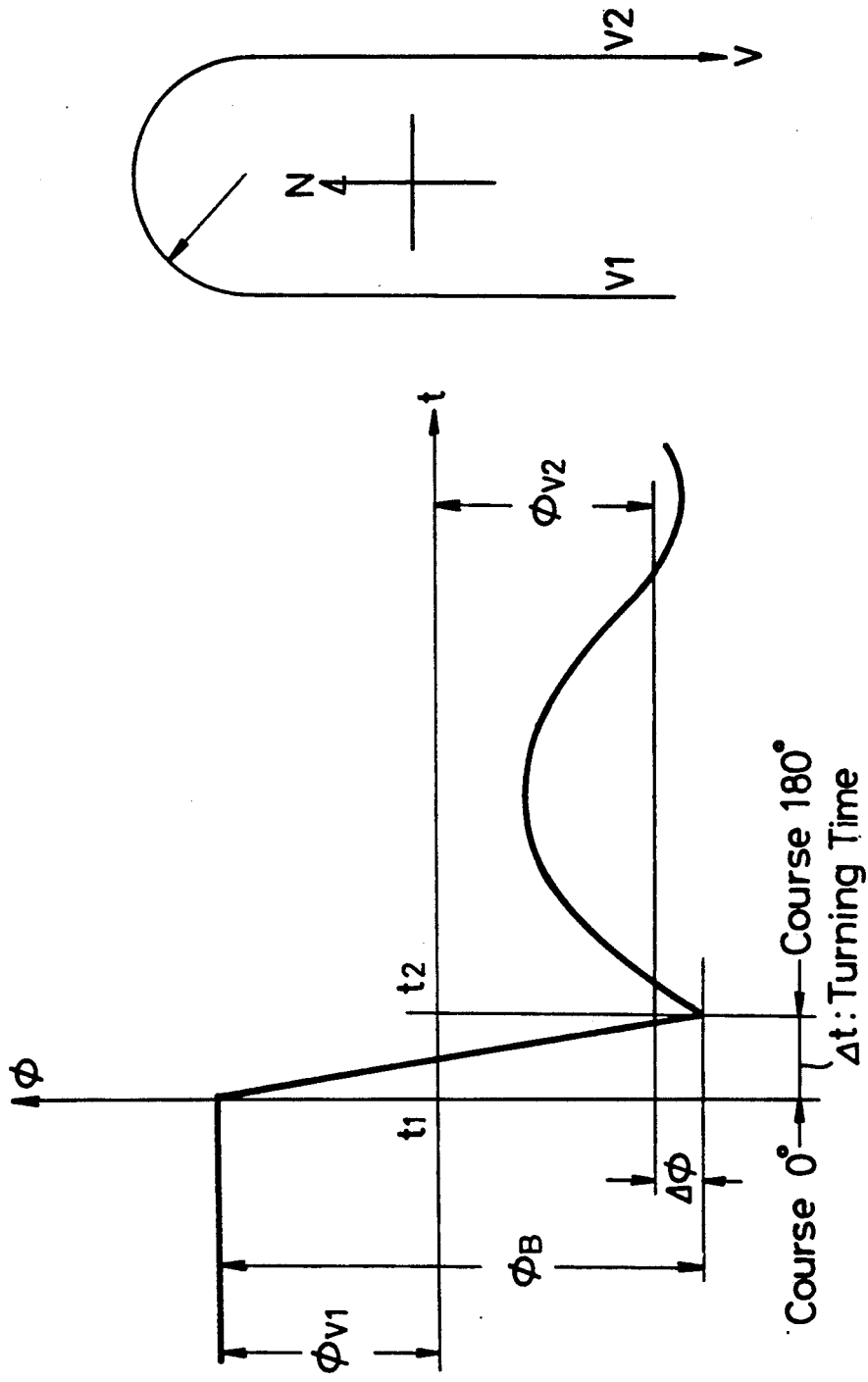
FIG. 5 is a graph to which references will be made in explaining a gyro compass error caused when a navigation vehicle is moved.

Accordingly, if a variable setting mechanism, which can variably set the value of k which is obtained by inputting a value of $\lambda$ into the above equation (10-1) and calculating the equation (10-1) in a suitable value within a range of plus, zero and minus, is provided in the acceleration error control device 62 and the value of k is always set at a value corresponding to a position or latitude at which the gyro compass exists, the gyro compass always satisfies the Schuler tuning condition correctly and hence $\Delta\phi$ in FIG. 5, namely, acceleration error can be made zero.

On the contrary, according to the conventional gyro compass, since the period T is determined by the equation (9), the period coincides with 84.5 minutes which is the Schuler tuning condition only at a set reference latitude, in this case, $\lambda_0$. At other positions or latitudes, the periods, which are calculated by substituting the values of those latitudes $\lambda$ into the equation (9), respectively, are of course displaced from 84.5 minutes and hence the Schuler tuning condition can not be satisfied.

The acceleration error will be discussed in detail further. Even when the Shuler tuning is established so as to make $\Delta\phi$ in FIG. 5 zero, there is presented a little error. This little error is shown by one-dot chain line II in FIG. 8. The reason why the little error is generated is that although at the time point $t_2$ the error relating to the azimuth is an ideal value or zero, an error is produced in the gyro inclination angle $\theta$ and hence a transient phenomenon is generated in the gyro newly. The acceleration error caused by the gyro inclination is that during the period in which the south-north acceleration is applied to the gyro, this acceleration is applied to the damping weight 7 which causes the torque about the vertical shafts 2 and 2' and this torque causes the precession in the inclination. It is known that the little error can be cancelled by such a known manner that an approximate value of the south-north acceleration is obtained by a separate system from the gyro compass, the vertical axis torque generated by the fact that the above acceleration exerts on the damping weight 7 is calculated, and this vertical axis torque is applied about the vertical shafts 2 and 2' of the gyro through the vertical torquer 61 to thereby cancel the torque generated by the south-north horizontal acceleration of the damping weight 7, which is expressed by the following equation (11) which is also expressed in FIG. 7.

$$\frac{\mu}{g} \frac{d}{dt} V_N \quad (11)$$

The speed $V_0$ of the ship can be known by a speed meter such as a log or the like. The south-north speed $V_N$ of the ship can be obtained by the above speed $V_0$ and a course angle of the ship shown by the gyro compass (an angle between the north and the ship's course which is a ship's azimuth C) as follows:

$$V_N = V_0 \cos C \quad (12)$$

The south-north acceleration $a_N$ can be easily obtained by differentiating $V_N$.

According to the study of the inventors of the present invention, however, it is ascertained that when the Shuler tuning is always established by the acceleration error control device 62, the accelerometer 60 and the vertical torquer 61, the acceleration error in the inclination, which is remained in the gyro inclination angle $\theta$ after an acceleration such as turning and so on is applied to the ship, is not so simple as described above and can not cancelled by employing the following equation (13):

$$\bar{\mu} = \mu \quad (13)$$

The above study proves that if the value $\bar{\mu}$ is obtained by the following equation (14), the above problem can be solved.

$$\bar{\mu} \approx \frac{H}{H + k} \mu \quad (14)$$

Figure 8:
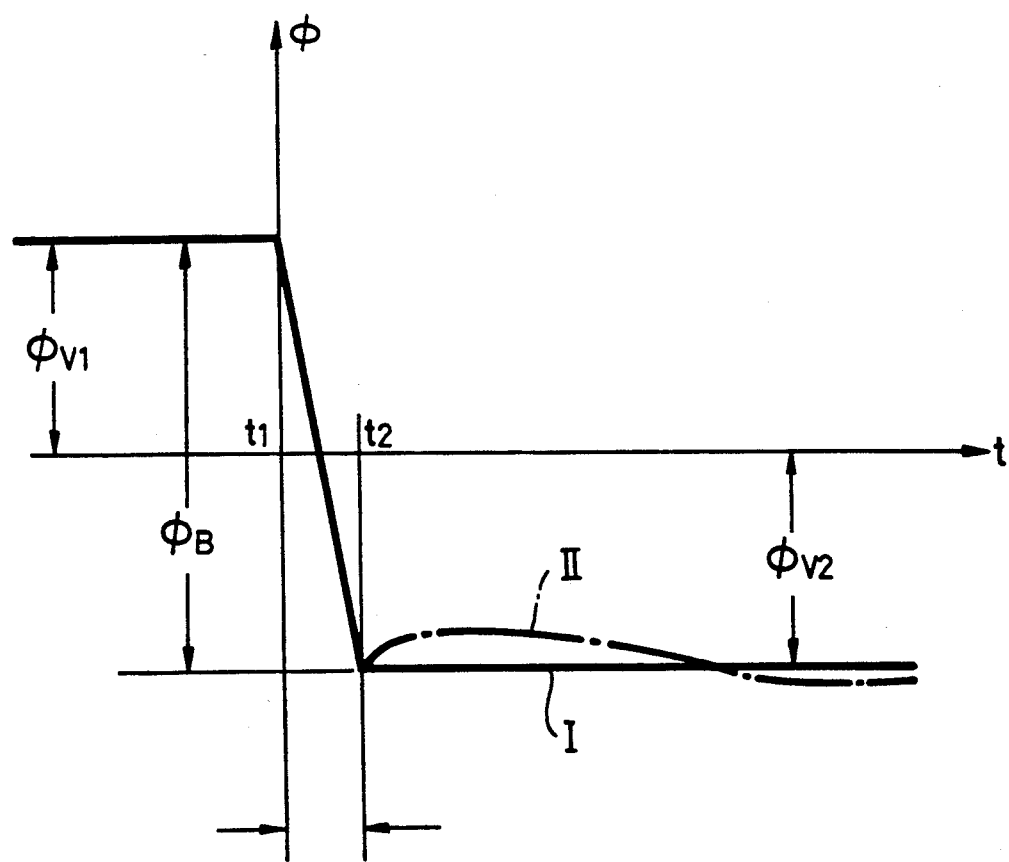
FIG. 8 is a graph used to explain an error of the gyro compass when it is moved by sailing of a ship.

If the value $\mu$ expressed by the equation (14) is employed, as shown by a solid line I in FIG. 8, after the time point $t_2$ when no acceleration is applied, the gyro spin axis is orientated just to the ideal azimuth. Thus, no transient phenomenon is generated in the gyro and completely no error state except for the speed error $\phi v_2$ can be realized.

The speed error $\phi v_2$ is determined by the course of ship, its speed and its latitude, can be easily corrected by the above three values by the prior art technique or known from a graph with no problem in practice so that the explanation of its correcting method will be omitted.

When carrying out the correction by $\mu$, in general, the speed signal of the ship and the course information of the ship from the azimuth transmitter 20 of the gyro compass are supplied to the acceleration error control device 62 through lines 64B and 64A as shown in FIG. 6 and then, the calculations of $V_N$, $a_N$ and so on are performed in the acceleration error control device 62. Further, when the setting value of k is changed for the Schuler tuning, it is convenient that the change of $\bar{\mu}$ by the equation (14) is carried out at the same time.

In the embodiment shown in FIG. 6, although the accelerometer 60 is provided, it may be replaced by an inclinometer used for the same purpose or if the gyro compass comprises the means for generating the inclination signal within itself, this inclination signal may be used in place of the signal from the accelerometer 60.

According to the present invention set forth above, the torque substantially in proportion to the differentiation of the inclination of the gyro spin axis is applied about the vertical axis of the gyro case so that the Schuler tuning can be established correctly at any latitudes. Further, when the torque in proportion to the value, which is obtained by multiplying the predetermined coefficient on the south-north acceleration, is added, the accurate azimuth of the ship can be always indicated.

Further, the gyro compass applied with the present invention can be installed on a high speed ship.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

What is claimed is:

1. A gyro compass having a gyro case therein a gyro whose spin axis is held substantially in the horizontal plane, a supporting device for supporting said gyro case with freedom of three axes and means for applying a torque proportional to an inclined angle of said gyro spin axis relative to the horizontal plane around a vertical axis of said gyro case perpendicular to said spin axis, comprising:
   a) detecting means for detecting an inclination angle of said spin axis relative to said horizontal plane;
   b) torquer means for applying a torque to said gyro case about its vertical axis; and
   c) acceleration error controlling means formed of differentiating means receiving an output signal from said detecting means, and coefficient calculating means receiving a latitude value at a position where said gyro compass exists and calculating a coefficient value k for said differentiating means in accordance with an equation $$k \approx \frac{T^2 K\Omega \cos\lambda}{4\pi^2} - H$$

where T is a Schuler tuning period, K a ballistic constant, H an angular momentum of the gyro, and $\Omega$ an earth rotation angular velocity, said coefficient value k being supplied to said differentiating means, an output from said differentiating means being applied to said torquer means such that said torquer means produces a predetermined torque to be applied to said gyro case about its vertical axis.

2. A gyro compass according to claim 1 further comprising means for generating a damping torque proportional to the inclination of said spin axis relative to the horizontal plane, said damping torque being applied about the vertical axis perpendicular to said spin axis.

3. A gyro compass according to claim 2 further comprising means for generating a second torque in proportion to a south-north acceleration, said second torque being applied to said gyro case about its vertical axis through said torquer means.

4. A gyro compass as claimed in claim 3, in which when k at a particular instant is a proportional coefficient of the torque proportional to the differentiated value, than H is an angular momentum of the gyro and $\mu$ is a proportional coefficient of said damping torque relative to said inclination angle, and said second torque has a coefficient expressed by $$\mu \cdot \frac{H}{H + k}.$$

* * * * *